(12) United States Patent
Wei et al.

(10) Patent No.: US 8,539,249 B2
(45) Date of Patent: Sep. 17, 2013

(54) SYSTEM AND METHOD FOR SECURITY AUTHENTICATION USING BIOMETRIC AUTHENTICATION TECHNIQUE

(75) Inventors: Jiwei Wei, Guangdong Province (CN); Zhibin Zheng, Guangdong Province (CN); Chao Li, Guangdong Province (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1745 days.

(21) Appl. No.: 11/584,364

(22) Filed: Oct. 20, 2006

(65) Prior Publication Data

US 2007/0094509 A1      Apr. 26, 2007

(30) Foreign Application Priority Data

Oct. 22, 2005   (CN) .......................... 2005 1 0100660

(51) Int. Cl.
*G06F 21/00*      (2013.01)
(52) U.S. Cl.
USPC ........................................................ 713/186
(58) Field of Classification Search
USPC ........................................................ 713/186
See application file for complete search history.

(56) References Cited

U.S. PATENT DOCUMENTS

| 6,940,976 | B1 * | 9/2005 | Matyas et al. ................... 380/44 |
| 7,484,246 | B2 * | 1/2009 | Matsuyama et al. ............ 726/27 |
| 2002/0027494 | A1 | 3/2002 | Watanabe et al. |
| 2004/0049687 | A1 | 3/2004 | Orsini et al. |
| 2004/0153656 | A1 | 8/2004 | Cluts et al. |
| 2004/0162984 | A1 * | 8/2004 | Freeman et al. .............. 713/175 |
| 2008/0019573 | A1 * | 1/2008 | Baltatu et al. ................. 382/115 |
| 2009/0327706 | A1 * | 12/2009 | Ikeda et al. ................... 713/156 |

FOREIGN PATENT DOCUMENTS

| CN | 1520090 A | 8/2004 |
| CN | 1596423 | 3/2005 |
| CN | 1627683 | 6/2005 |
| JP | 2005004253 A | 1/2005 |
| WO | 01/27723 A1 | 4/2001 |
| WO | WO01/40982 | 6/2001 |
| WO | WO2004/019190 | 3/2004 |

OTHER PUBLICATIONS

Office action issued in corresponding Chinese patent application No. 200510100660.8, dated Oct. 11, 2010, Partial English translation thereof; total 8 pages.
Office action issued in corresponding Chinese patent application No. 200510100660.8, dated May 8, 2009, English translation thereof; total 8 pages.

(Continued)

*Primary Examiner* — Tamara T Kyle
(74) *Attorney, Agent, or Firm* — Conley Rose, P.C.; Grant Rodolph; Nicholas K. Beaulieu (57) ABSTRACT

A system and a method for security authentication, in which a biometric authentication subsystem in the security authentication system receives a biometric certificate held by the user and the user's biometric information from a user terminal; the biometric certificate contains the user's biometric template or the storage address of the biometric template; next, the biometric authentication subsystem authenticates the biometric certificate, performs matching between the biometric information and the biometric template, and generates the identity authentication result. The invention can also combine biometric authentication with PMI privilege authentication, so as to enhance security of identity authentication in PMI and widen applicability of biometric authentication.

23 Claims, 5 Drawing Sheets

(56) References Cited

OTHER PUBLICATIONS

Office action issued in corresponding Chinese patent application No. 200680012262.3, dated Sep. 4, 2009, English translation thereof; total 22 pages.

Office action issued in corresponding European patent application No. EP06022156.1, dated Jun. 18, 2009; total 5 pages.

Written Opinion issued in corresponding PCT application No. PCT/CN2006/002732, dated Feb. 1, 2007; total 5 pages.

* cited by examiner

SYSTEM AND METHOD FOR SECURITY AUTHENTICATION USING BIOMETRIC AUTHENTICATION TECHNIQUE

FIELD OF THE INVENTION

The present invention relates to the technical field of network security, particularly to a system and a method for security authentication using biometric authentication technique.

BACKGROUND OF THE INVENTION

Biometric authentication technique utilizes human biometric characteristics (e.g., fingerprint, iris, and voice) to carry out identity authentication. Along with the development and improvement of the computer technology and a variety of algorithms evolve, biometric authentication technique has been widely used as an accurate, quick, and efficient identity authentication means in security fields.

In an existing technique that utilizes biometric authentication technique for identity authentication, the user's biometric characteristic data is acquired first to generate a template of biometric characteristics. During the identity authentication, the biometric characteristic data of the user to be authenticated is reacquired and matched with the generated template of biometric characteristics, so as to obtain the judgment result based on whether the matching result is within a valid range.

SUMMARY OF THE INVENTION

Embodiments of the present invention provide a security authentication system and a security authentication method, which may enhance security of identity authentication with biometric information.

The security authentication system comprises:

a user terminal, adapted to acquire user's biometric information and send the biometric information and user's biometric certificate, wherein the biometric certificate contains user's biometric template or storage address of the user's biometric template;

a biometric authentication subsystem, adapted to authenticate the biometric certificate by matching the biometric information with the biometric template to generate an identity authentication result.

In another aspect, the security authentication system comprises:

a user terminal, adapted to acquire user's biometric information and send the biometric information, user's biometric certificate and privilege attribute information to declare the user's privilege, wherein the biometric certificate includes user's biometric template or storage address of the user's biometric template;

a biometric authentication subsystem, adapted to authenticate the biometric certificate by matching the biometric information with the biometric template with a biometric recognition algorithm to generate an identity authentication result;

a privilege authentication subsystem, adapted to provide user's attribute parameter information in accordance with the privilege attribute information, and authenticate privilege declared by the user in accordance with the privilege attribute information when the identity authentication result is acceptable;

a biometric algorithm certificate directory, adapted to provide biometric recognition parameter information corresponding to the user's attribute parameter information and the biometric recognition algorithm and provide the biometric recognition parameter information to the biometric authentication subsystem for matching.

The security authentication method comprises:

receiving user's biometric certificate and biometric information sent from a user terminal, wherein the biometric certificate includes user's biometric template or storage address of the user's biometric template;

authenticating the biometric certificate by matching the biometric information with the biometric template to generate an identity authentication result.

In another aspect, the security authentication method comprises:

a privilege authentication subsystem outputting user's attribute parameter information, wherein the attribute information corresponds to privilege attribute information sent from a user terminal;

a biometric authentication subsystem requesting for biometric recognition parameter information in accordance with a biometric authentication mode negotiated with the user terminal;

a biometric algorithm certificate directory providing biometric recognition parameter information in accordance with the user's attribute parameter information and the biometric authentication mode;

the biometric authentication subsystem matching the biometric information from the user terminal with the biometric template corresponding to the biometric certificate in accordance with the biometric recognition parameter information to generate an identity authentication result;

after the identity authentication result is acceptable, the privilege authentication subsystem authenticating privilege declared by the user in accordance with the privilege attribute information.

In the embodiments of the present invention, the user terminal sends the biometric certificate and the user's biometric information; the biometric authentication subsystem performs authentication for the user's identity in accordance with the biometric certificate and the biometric information; since a biometric certificate is used, the authenticity may be ensured effectively, and thereby the security of identity authentication with biometric information may be enhanced.

Furthermore, the biometric authentication technique provided in the embodiments of the present invention can be used in conjunction with PKI technique to include public key certificate identification information in the biometric certificate, so as to effectively ensure security of the private key in the public key certificate, and ensure only the user who has passed the biometric authentication can use the private key.

The solution of identity authentication with biometric certificate can be used in conjunction with privilege authentication to perform identity authentication and privilege authentication for the user; thanks to the nature of biometric information such as uniqueness and stability, the authenticity of privilege authentication can be ensured; furthermore, the biometric recognition parameter information can be adjusted in accordance with the privilege attribute information, so that the authenticity of authentication result matches the security level specified in the privilege for the protected resources; therefore, the embodiments of the present invention are adaptive to different conditions and demands.

DETAILED DESCRIPTION OF THE EMBODIMENTS

To make the object, the technical solution, and the advantages of the present invention understood better, hereunder the present invention is further described in detail with reference to the embodiments and the accompanying drawings. It should be understood that the embodiments described here are only used to explain the present invention and shall not be deemed as any limitation to the present invention.

Figure 1:
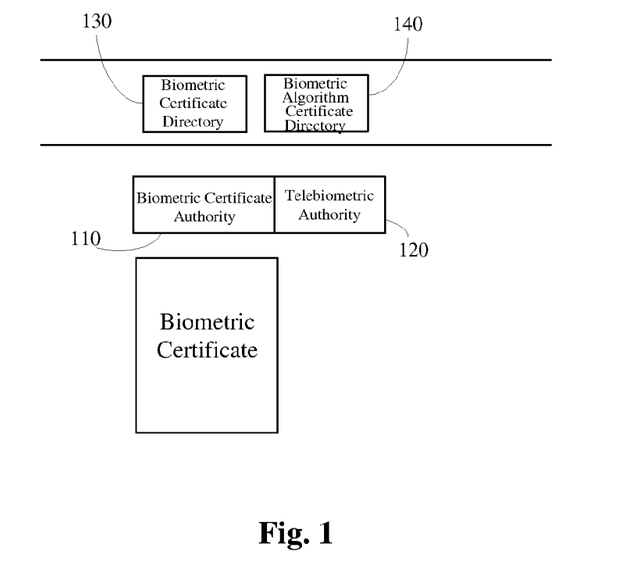
FIG. 1 is a schematic diagram of BAI architecture, which is the basis of the security authentication system provided in an embodiment of the present invention.

The security authentication system is implemented on the basis of Biometric Authentication Infrastructure (BAI). FIG. 1 illustrates a schematic diagram of BAI architecture that is the basis of security authentication system provided in the embodiments of the present invention.

BAI includes: Biometric Certificate Authority (BCA) 110, Telebiometric Authority (TBA) 120, Biometric Certificate Directory (BCD) 130, and Biometric Algorithm Certificate Directory (BACD) 140.

BCA 110 is a third-party authority that issues the biometric certificate certified with digital signature and containing the biometric template or the storage address of the biometric template to the user terminal. That is to say, the biometric certificate is bound with the user's identity and biometric information and is certified by BCA 110 with digital signature.

BCD 130 stores the user's biometric certificate.

TBA 120 is a trusted third-party authority that performs certification for different biometric recognition algorithms and issues certified biometric recognition algorithms to BACD 140.

BACD 140 stores biometric recognition algorithms and biometric recognition parameters such as recognition thresholds and security authentication levels in an appropriate form (e.g., directory).

Figure 2:
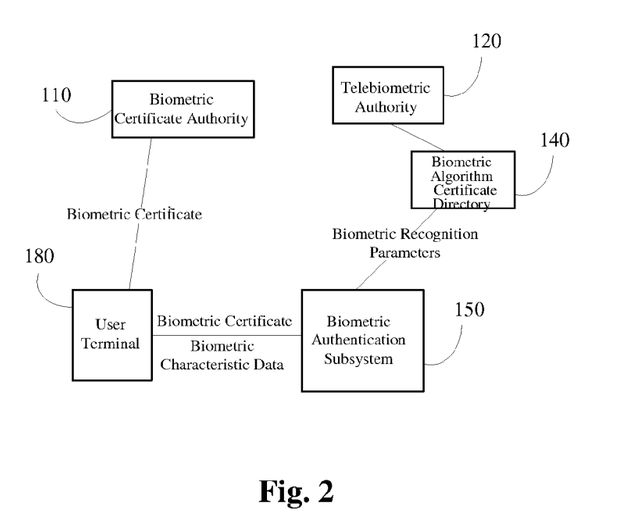
FIG. 2 is a block diagram of security authentication system provided in an embodiment of the present invention.

FIG. 2 illustrates the block diagram of the security authentication system provided in the embodiments of the present invention.

The security authentication system includes user terminal 180, Biometric Authentication Subsystem (BAS) 150, and BACD 140.

During the authentication, the user terminal 180 provides biometric certificate and acquired biometric information to BAS 150; BAS 150 compares the acquired biometric information of the user with the biometric template contained in the biometric certificate to ascertain legality of the user's identity. The biometric recognition parameters required for identity authentication are provided by BACD 140 of the security authentication system or a trusted third party, depending on the system environment and the authentication strategy.

The user terminal 180 has a biometric data acquisition subsystem (not shown), adapted to acquire the user's biometric information.

Figure 3:
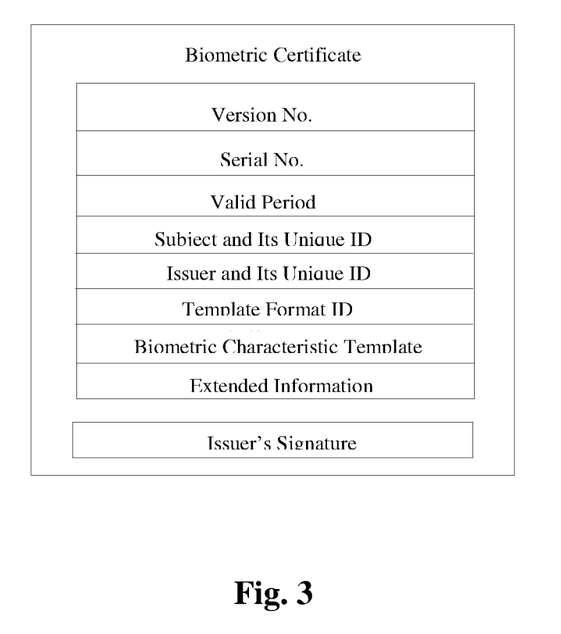
FIG. 3 is a schematic diagram of biometric certificate utilized in an embodiment of the present invention.

FIG. 3 illustrates a schematic diagram of the biometric certificate utilized in an embodiment of the present invention. The biometric certificate includes the following items:

Version No.: version number of the biometric certificate issued by BCA;

Serial No.: unique ID of the biometric certificate issued by BCA;

Validity Period: including start date and end data of the validity period, adapted to indicate the validity period of the biometric certificate.

Subject: the individual or entity identified by the certificate, which can be differentiated and verified by the unique ID of the subject;

Issuer: the trusted BCA which generates the certificate and signs the certificate and which can be differentiated and verified by the unique ID;

Template Format ID: format identification information of the biometric template;

Biometric Template: stores the biometric information and biometric recognition related parameters of the Subject.

Extended Information: additional information which can be encoded in the certificate without changing certificate format; in some application cases, other information such as additional information, methods declaring the usage of the certificate and so on can be added into the certificate.

Signature of Issuer: digital signature provided with BCA's private key for summary of Serial No., Validity Period, Subject and unique ID, Issuer and unique ID, Template Format ID, Biometric Template, and Extended Information.

Figure 4:
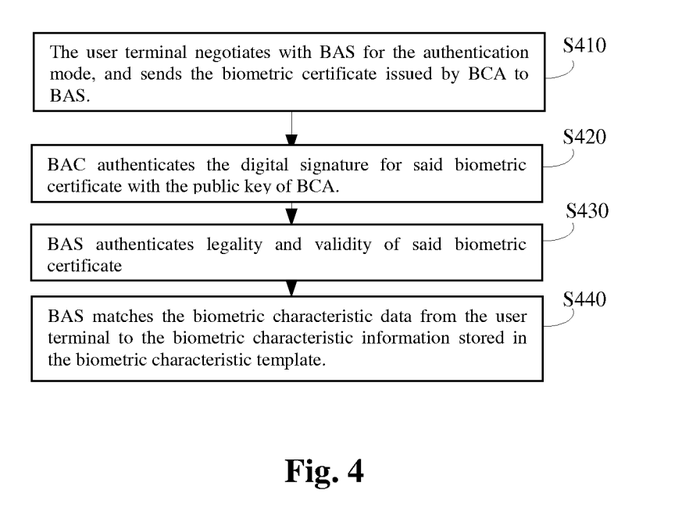
FIG. 4 is a flow chart of security authentication method provided in an embodiment of the present invention.

FIG. 4 illustrates the flow chart of security authentication method provided in an embodiment of the present invention.

Step S410: when the authentication process begins, the user terminal negotiates with BAS for the authentication mode and sends the biometric certificate issued by BCA to BAS.

Step S420: BAS authenticates the digital signature of the biometric certificate with the public key of BCA.

Step S430: after the digital signature is authenticated successfully, BAS authenticates legality and validity of the biometric certificate, for example, authenticates whether the biometric certificate has expired or has been revoked.

Step S440: after successful authentication, BAS matches the biometric information from the user terminal with the biometric template in the biometric certificate to generate the authentication result.

In step S440, the BAS needs to acquire the biometric template in accordance with the template format ID included in the biometric certificate.

In step S440, the BAS can also obtain the biometric recognition parameters (e.g., recognition threshold, etc.) required for the authentication process from BACD; this is because the biometric authentication result is obtained by judging whether the matching result of biometric information is in the valid range, wherein the matching is an approximate matching process instead of exact matching process as used in cryptographic systems. The validity of biometric recognition varies from system to system, depending on the biometric information type and the biometric recognition algorithm used in the system.

Figure 5:
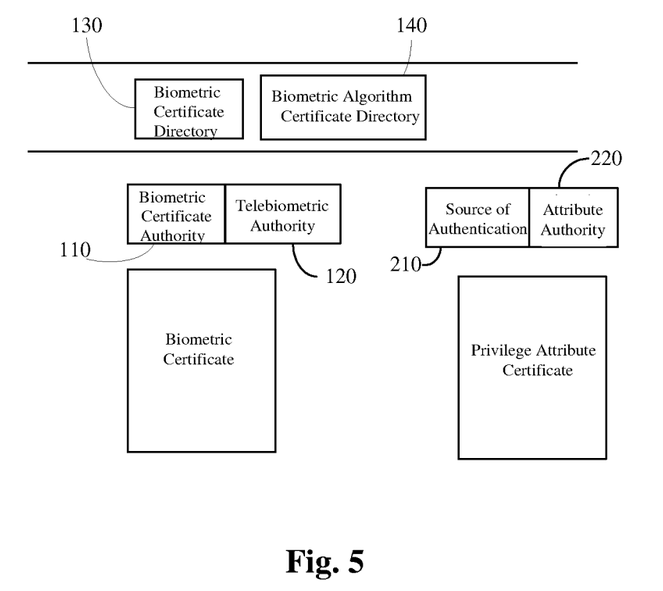
FIG. 5 is a schematic diagram of combined BAI and PKI architecture, which is the basis of the security authentication system provided in an embodiment of the present invention.

FIG. 5 illustrates a schematic diagram of infrastructure that is the basis of the security authentication system provided in an embodiment of the present invention.

The security authentication system incorporates biometric certificate-based BAI and Privilege Management Infrastructure (PMI) to implement user identity authentication and privilege authentication. BAI includes BCA 110, TBA 120, BCD 130, and BACD 140; PMI includes Source of Authentication (SOA) 210 and Attribute Authority (AA) 220.

SOA 210 is the central service node in PMI as well as the ultimate source of confidence and the superlative administrative organization, responsible for management of authorization control strategy, acceptance and handling of application authorization, verification and management of establishment of AA, and service normalization in the authorization management system.

AA 220 is a core service node in PMI and an authorization management subsystem for a specific application system; it establishes mutual trusting relationship with SOA 210 by means of a service agreement, and is responsible for acceptance and handling of application authorization, issue and management of privilege attribute certificates, and verification and management of establishment of AA agents. AA 220 need to maintain historic records and update records for all privilege attribute certificates issued by it.

In the security authentication system, BAI and PMI are relatively independent to each other logically; the generation and maintenance of identities in BAI is independent to PMI; BAI is usually established earlier than PMI. However, when providing authorization service using privilege certificates, they are correlated with each other.

Figure 6:
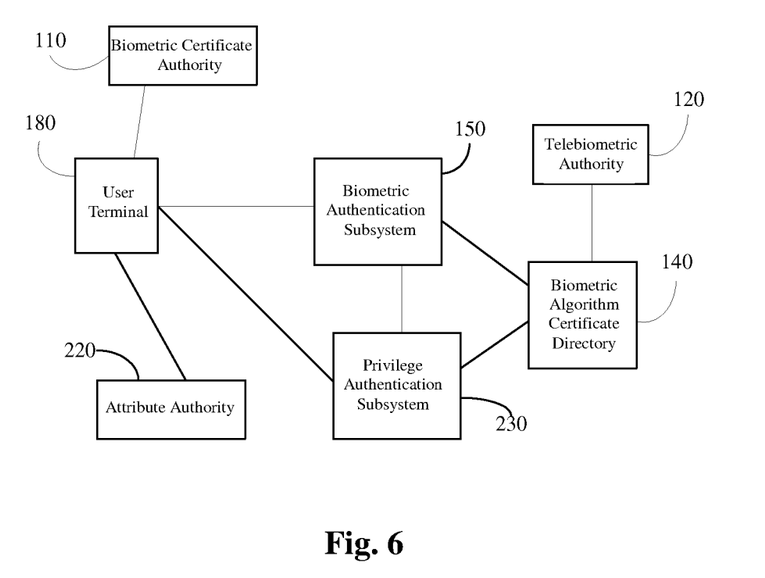
FIG. 6 is a block diagram of the security authentication system provided in an embodiment of the present invention.

FIG. 6 illustrates the block diagram of the security authentication system provided in an embodiment of the present invention.

The security authentication system includes BAS 150, Privilege Authentication Subsystem (PAS) 230 and BACD 140.

PAS 230 provides user attribute parameters required for biometric authentication; BACD 140 provides biometric recognition parameters corresponding to the user attribute parameters to BAS 150 in accordance with the user attribute parameters provided by PAS 230; BAS 150 utilizes the biometric certificate to authenticate the user's biometric information in accordance with the biometric recognition parameters provided by BACD 140, so as to implement user identity recognition and authentication. PAS 230 performs privilege authentication for the user who has passed the identity authentication.

That is to say, PAS 230 achieves its combination with BAS 150 via BACD 140. PAS and BAS can be implemented with prior arts in various forms, and therefore will not be described further here.

Authentic biometric recognition parameters (e.g., recognition threshold, etc.) are required for BAI to perform user identity authentication with the biometric certificate. Therefore, a biometric algorithm certificate directory BACD 140 that provides biometric recognition parameters must be established along with BAI.

It is noted that BACD 140 is only responsible for providing biometric recognition parameters, and the specific actions are usually taken by the corresponding biometric algorithm certificate processing unit (not shown).

This is because: the result of biometric recognition and authentication is obtained by judging whether the biometric information matching result is within the valid range. The matching is an approximate matching process instead of an exact matching process as used in cryptographic systems. The validity of biometric recognition varies from system to system, depending on the biometric information type and the biometric recognition algorithm used in the system. In the biometric recognition algorithm, the recognition threshold is an important parameter, which is used by the biometric recognition algorithm when the biometric recognition is performed. The recognition threshold has direct influence to accuracy of the recognition result, i.e., the recognition result from the biometric recognition algorithm may vary, depending on the threshold setting.

Furthermore, there are common configurable parameters for all biometric authentication processes: Fault Acceptance Rate (FAR) and Fault Rejection Rate (FRR). FAR is a parameter that is used to measure the percentage that a user should have been rejected but is accepted by the system; FRR is a parameter that is used to measure the percentage that a user should have been accepted but is rejected by the system. FAR and FRR constrain each other and are directly depended on the recognition threshold. To decrease the possibility (i.e., FAR) of illegal users intruding in the system and thereby enhance system security level using a strict strategy, the recognition threshold has to be increased, which will also result in increased probability (i.e., FRR) of legal users being rejected. To decrease the possibility (i.e., FRR) of the system rejecting legal users, the recognition threshold has to be decreased, which will also result in increased probability (i.e., FAR) of illegal users being authorized and thereby degrading security level of the authentication system.

As described above, the biometric recognition parameters required for BAS 150 to perform biometric recognition and authentication are provided by BACD 140; however, BACD 140 can not determine the biometric recognition parameters until it obtains the user attribute parameters from PAS 230. That is to say, PAS 230 is required to provide a biometric authentication accuracy parameter to instruct BAS 150 to perform biometric recognition and authentication, so as to meet the demand for identity authentication for users with privileges at different security levels. The biometric authentication accuracy parameter is determined by PAS 230 in accordance with the security requirement of the resources to be accessed.

In actual implementation, the privilege attribute certificate from PMI can be modified to include the user attribute parameters required for biometric authentication; for example, the user attribute parameters can be added in the extended information of the privilege attribute certificate.

In an embodiment of the present invention, a list of attribute security levels (i.e., the list of security levels corresponding to the privilege attribute information declared in the privilege attribute certificate) can be added in the extended information of the privilege attribute certificate; the security level directly reflects authenticity of the biometric authentication result.

Furthermore, in a privilege attribute certificate which supports roles, there is a list of attribute security levels for the privilege attributes corresponding to the roles, to facilitate the privilege authenticator to learn about the security level required by the privilege.

Accordingly, BACD 140 contains a correspondence list of security levels and biometric recognition parameters, to record the biometric recognition parameters corresponding to different recognition algorithms for different biometric characteristic types.

Figure 7:
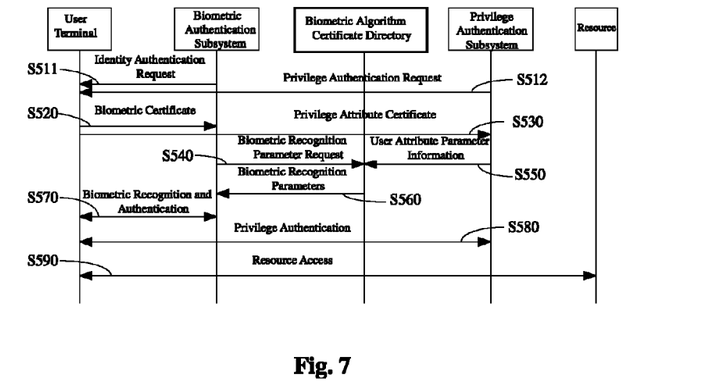
FIG. 7 is a flow chart of security authentication method provided in an embodiment of the present invention.

FIG. 7 illustrates the flow chart of identity authentication and privilege authentication implemented with the combination of BAS and PAS in an embodiment of the present invention.

When the user requests to access specific resources, BAS sends an identity authentication request to the user (Step S511), and PAS sends a privilege authentication request to the user (Step S512).

Step S520: the user responds to the identity authentication request from BAS, negotiates the authentication mode with BAS, and sends the biometric certificate to BAS.

Step S530: while Step S520 is executed, the user, at the same time, responds to the privilege authentication request from PAS, declares the access privilege for the resources, and sends the privilege attribute certificate to PAS.

Step S540: BAS sends a request for biometric recognition parameters (e.g., recognition threshold) to BACD in accordance with the negotiated authentication mode and the biometric recognition algorithm.

Step S550: while Step S540 is executed, PAS, at the same time, sends the user's attribute parameter information (e.g., the security level corresponding to the user's privilege attribute) in the privilege attribute certificate to BACD in accordance with the privilege declared by the user.

Step S560: BACD searches the corresponding biometric recognition parameters and sends the parameters to BAS in accordance with the request for parameters sent in Step S540 and the security level sent in Step S550.

Step S570: BAS performs identity authentication for the user with the biometric recognition parameters provided by BACD.

Step S580: if the user passes the identity authentication, PAS authenticates the user's privilege; otherwise PAS rejects the user's request directly.

Step S590: if the user passes the privilege authentication performed by PAS, the user can access the specified resources within the declared privilege range.

In above embodiment, there is little interaction between BAS and PAS; BAS and PAS operate relatively independently to each other, and BAS directly negotiates with the user for the authentication mode, without reference to security level of the access privilege.

Figure 8:
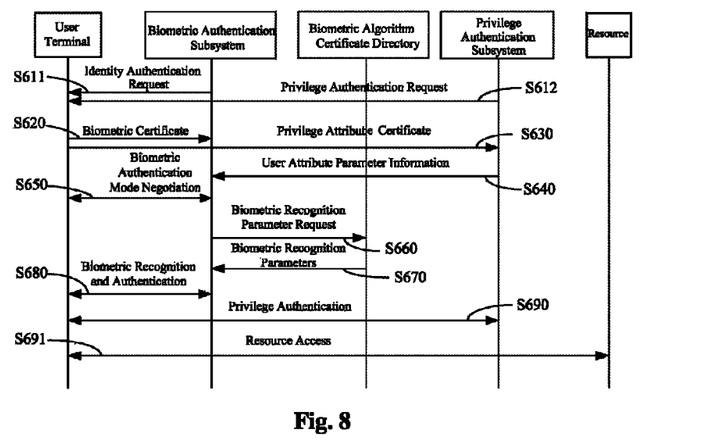
FIG. 8 is a flow chart of security authentication method provided in an embodiment of the present invention.

FIG. 8 illustrates the flow chart of identity authentication and privilege authentication implemented with the combination of BAS and PAS in an embodiment of the present invention.

When the user requests to access specific resources, BAS and PAS send identity authentication request (step S611) and privilege authentication request (Step 612) respectively.

Step S620: the user responds to the identity authentication request from BAS, negotiates the authentication mode with BAS, and sends the biometric certificate to BAS.

Step S630: while Step S620 is executed, the user, at the same time, responds to the privilege authentication request from PAS, declares the access privilege for the resources, and sends the privilege attribute certificate to PAS.

Step S640: PAS sends the user's attribute parameter information (e.g., the security level corresponding to the user's privilege attribute) in the privilege attribute certificate to BAS.

Step S650: BAS negotiates with the user for the biometric authentication mode in accordance with the security level.

Step S660: BAS determines the biometric recognition algorithm in accordance with the negotiated authentication mode, and sends a request for biometric recognition parameters (e.g., recognition threshold) to BACD carrying relevant parameters (e.g., biometric recognition type, recognition algorithm, and attribute security level) carried in the request.

Step S670: BACD searches the biometric recognition parameters matching the request in accordance with the parameters carried in the request in Step S660, and sends the biometric recognition parameters to BAS.

Step S680: BAS performs identity authentication for the user with the biometric recognition parameters from BACD.

Step S690: if the user passes the identity authentication, PAS authenticates the user's privilege; otherwise PAS rejects the user's request directly.

Step S691: if the user passes the identity authentication and the privilege authentication, it is permitted to access the specified resources within the declared privilege range.

In above embodiment, there is much interaction between BAS and PAS; during the identity authentication, BAS refers to the security level of access privilege before it negotiates with the user for the authentication mode.

In the embodiments of the present invention, the privilege information required for PMI authentication can be added into the extended information of the biometric algorithm certificate, so as to implement combination of BAI and PMI; the specific process will not be described here.

Figure 9:
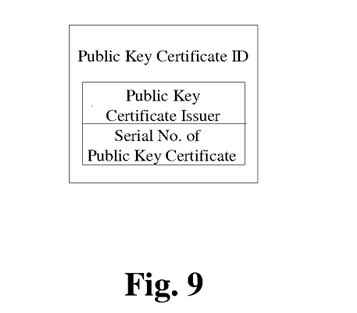
FIG. 9 is a schematic diagram of biometric certificate including public key certificate identification information that is utilized in an embodiment of the present invention.

Furthermore, in the embodiments of the present invention, BAI also can combine with Public Key Infrastructure (PKI). In that case, the biometric certificate has to be used in conjunction with the public key certificate in PKI; the identification information of public key certificate (e.g., issuer and serial number of the public key certificate, etc.) can be added in the extended information of the biometric certificate, as shown in FIG. 9. In such embodiments, the private key in the public key certificate is protected by the biometric certificate, so that only the user who passes the biometric authentication is permitted to use the private key.

Figure 10:
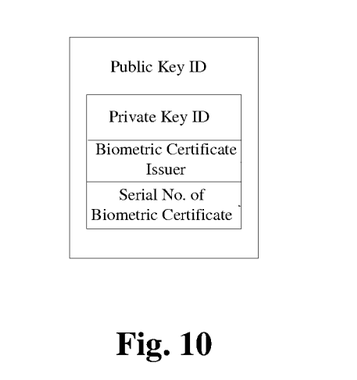
FIG. 10 is a schematic diagram of biometric certificate including public key ID that is utilized in an embodiment of the present invention.

FIG. 10 illustrates that the public key ID can also be added in the extended information of the biometric certificate to indicate which one of the public keys possessed by the biometric certificate authority will be used to authenticate the digital signature for the biometric certificate, which makes it possible for a biometric certificate authority to use multiple key pairs.

Though the present invention is described in preferred embodiments as above, it is noted that those embodiments shall not be deemed as constituting any limitation to the present invention; any modification, equivalent replacement, or improvement to the embodiments without departing from the spirit and principle of the present invention shall fall into the protected scope of the present invention.

We claim:

1. A security authentication system, comprising:
   a user terminal, configured to acquire biometric information of a user and send the biometric information and a biometric certificate of the user to a biometric authentication subsystem, wherein the biometric certificate contains a biometric template of the user or a storage address of the biometric template of the user; and the user terminal is further configured to send a privilege attribute of the user to a privilege authentication subsystem to declare a privilege of the user;
   the biometric authentication subsystem, configured to authenticate the biometric certificate and match the biometric information of the user with the biometric template in accordance with one or more biometric recognition parameters to generate an identity authentication result;
   the privilege authentication subsystem, configured to provide an attribute parameter in accordance with the privilege attribute of the user, wherein the attribute parameter corresponds to the privilege attribute sent from the user terminal; and a storage device, configured to store a biometric algorithm certificate directory, wherein the biometric algorithm certificate directory contains the biometric recognition parameters required for the matching between the biometric information of the user and the biometric template, and wherein the biometric recognition parameters correspond to the attribute parameter of the user and a biometric recognition algorithm.

2. The security authentication system as in claim 1, wherein the biometric certificate comprises:

a validity period of the certificate, for use by the biometric authentication subsystem to determine the validity of the biometric certificate.

3. The security authentication system as in claim 1, wherein the biometric certificate comprises:

subject information, for use by the biometric authentication subsystem to determine an identity of the user.

4. The security authentication system as in claim 1, wherein the biometric certificate comprises a public key certificate identification (ID), for enabling the user to use a private key of a public key certificate if the identity authentication result is acceptable.

5. The security authentication system as in claim 1, wherein the biometric authentication subsystem is further configured to match the biometric information of the user with the biometric template by using a biometric recognition algorithm to generate the identity authentication result; and the privilege authentication subsystem is further configured to authenticate the privilege declared by the user in accordance with the privilege attribute of the user if the identity authentication result is acceptable.

6. The security authentication system as in claim 5, wherein the privilege authentication subsystem is further configured to output the attribute parameter to a biometric algorithm certificate processing unit corresponding to the biometric algorithm certificate directory.

7. The security authentication system as in claim 5, wherein the privilege authentication subsystem is further configured to output, via the biometric authentication subsystem, the attribute parameter to a biometric algorithm certificate processing unit corresponding to the biometric algorithm certificate directory.

8. The security authentication system as in claim 5, wherein the privilege attribute of the user is carried in a privilege attribute certificate of the user or in an extended information field of the biometric certificate of the user.

9. The security authentication system as in claim 5, wherein the biometric algorithm certificate directory further contains a biometric characteristic type identification (ID), a biometric recognition algorithm ID, and a correspondence list of the attribute parameter of the user and biometric recognition parameters.

10. The security authentication system as in claim 9, wherein the attribute parameter of the user includes security level information corresponding to the privilege attribute of the user.

11. The security authentication system as in claim 10, wherein the biometric recognition parameters include a recognition threshold corresponding to the security level information.

12. A security authentication method, comprising:

receiving, by a biometric authentication subsystem, a biometric certificate and biometric information of a user from a user terminal, wherein the biometric certificate includes a biometric template of the user or a storage address of the biometric template of the user;

receiving, by a privilege authentication subsystem, a privilege attribute of the user for declaring a privilege of the user;

obtaining by the biometric authentication subsystem, one or more biometric recognition parameters and a biometric recognition algorithm in a biometric algorithm certificate directory, and authenticating the biometric certificate of the user and matching the biometric information of the user with the biometric template of the user in accordance with the biometric recognition parameters to generate an identity authentication result, and obtaining, by the privilege authentication subsystem, an attribute parameter corresponding to the privilege attribute and performing a privilege authentication of the user in accordance with the privilege attribute if the identity authentication result is acceptable.

13. The security authentication method as in claim 12, wherein said authenticating the biometric certificate comprises:

acquiring a validity period in the biometric certificate and determining the validity of the biometric certificate.

14. The security authentication method as in claim 12, further comprising:

searching subject information from the biometric certificate and determining identity of the holder of the biometric certificate.

15. The security authentication method as in claim 12, wherein the biometric certificate further includes public key certificate identification information; and the method further comprises:

enabling the user to use a private key of the public key certificate if the identity authentication result is acceptable.

16. The security authentication method as in claim 12, comprising:

outputting, by the privilege authentication subsystem, the attribute parameter of the user, wherein the attribute parameter corresponds to the privilege attribute sent from the user terminal;

requesting, by the biometric authentication subsystem, the biometric recognition parameters in accordance with a biometric authentication mode negotiated with the user terminal;

providing, by a biometric algorithm certificate directory, biometric recognition parameters in accordance with the attribute parameter of the user and the biometric authentication mode;

matching, by the biometric authentication subsystem, biometric information from the user terminal with the biometric template corresponding to the biometric certificate in accordance with the biometric recognition parameters to generate an identity authentication result; and if the identity authentication result is acceptable, the privilege authentication subsystem authenticating the privilege declared by the user in accordance with the privilege attribute.

17. The security authentication method as in claim 16, wherein the privilege authentication subsystem outputting the attribute parameter of the user comprises:

the privilege authentication subsystem outputting the attribute parameter of the user to a biometric algorithm certificate processing unit corresponding to the biometric algorithm certificate directory.

18. The security authentication method as in claim 16, wherein the privilege authentication subsystem outputting the attribute parameter of the user comprises:

the privilege authentication subsystem outputting the attribute parameter of the user to the biometric authentication subsystem; the biometric authentication subsystem outputting the attribute parameter of the user to a biometric algorithm certificate processing unit corresponding to the biometric algorithm certificate directory.

19. The security authentication method as in claim 18, wherein the biometric authentication subsystem outputting the attribute parameter of the user to the biometric algorithm certificate processing unit is synchronous with requesting for the biometric recognition parameters.

20. The security authentication method as in claim 16, wherein the privilege attribute of the user is carried in a privilege attribute certificate of the user or in an extended information field of the biometric certificate.

21. The security authentication method as in claim 16, wherein the biometric algorithm certificate directory comprises:

a biometric characteristic type identification (ID),
a biometric recognition algorithm ID, and
a correspondence list of the attribute parameter of the user and biometric recognition parameters.

22. The security authentication method as in claim 16, wherein the attribute parameter information of the user includes security level information corresponding to the privilege attribute.

23. The security authentication method as in claim 22, wherein the biometric recognition parameters include a recognition threshold corresponding to the security level information.

* * * * *